United States Patent [19]

Shimanuki

[11] Patent Number: 5,546,649
[45] Date of Patent: Aug. 20, 1996

[54] ASSEMBLY METHOD OF CARRIAGE ASSEMBLY OF MAGNETIC DISK DRIVE

[75] Inventor: Machio Shimanuki, Ome, Japan

[73] Assignee: Kabushiki Kaisha Toshiba, Kawasaki, Japan

[21] Appl. No.: 304,857

[22] Filed: Sep. 13, 1994

[30] Foreign Application Priority Data

Sep. 14, 1993 [JP] Japan ..................... 5-228536

[51] Int. Cl.$^6$ ..................................... G11B 5/42
[52] U.S. Cl. ..................... 29/603.03; 29/603.04
[58] Field of Search ................ 29/603, 737, 603.03, 29/603.04; 360/104–106

[56] References Cited

U.S. PATENT DOCUMENTS

| 4,829,395 | 5/1989 | Coon et al. | 360/104 |
| 4,870,525 | 9/1989 | Wong et al. | 360/137 |

FOREIGN PATENT DOCUMENTS 5-303855  11/1993  Japan .

*Primary Examiner*—Carl E. Hall
*Attorney, Agent, or Firm*—Finnegan, Henderson, Farabow, Garrett & Dunner, L.L.P.

[57] ABSTRACT

In a method of assembling a carriage assembly, all first magnetic head assemblies facing first surfaces of magnetic disks are attached to associated arms of the carriage. Each of the magnetic head assemblies is fixed to one side surface of an associated one of the arms, by fitting and calking the mount portion of the first magnetic head assembly in the through-hole of the associated arm. Subsequently, all second magnetic head assemblies facing second surfaces of the magnetic disks are attached to the arms. Each of the second magnetic head assemblies is fixed to the other side surface of the associated one of the arms, by fitting and calking the mount portion of the second magnetic head assembly in the through-hole of the associated arm.

3 Claims, 9 Drawing Sheets

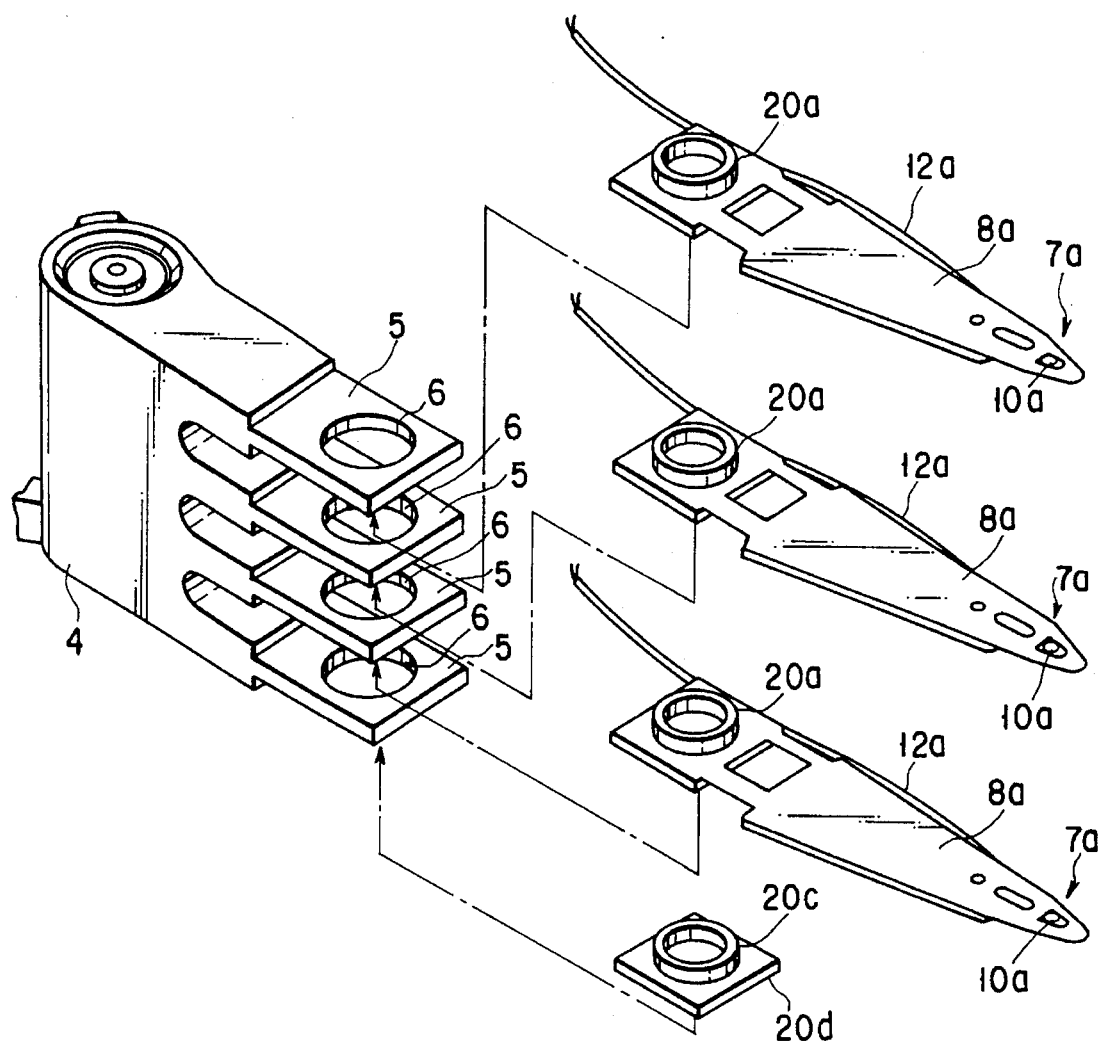
F I G. 7

ASSEMBLY METHOD OF CARRIAGE ASSEMBLY OF MAGNETIC DISK DRIVE

BACKGROUND OF THE INVENTION

1. Field of the Invention

The present invention relates to an assembly method of a carriage assembly in which magnetic head assemblies are assembled in a carriage with a plurality of arms of a magnetic disk drive.

2. Description of the Related Art

In a magnetic disk drive using a magnetic disk, a magnetic head is moved over a recording surface of the magnetic disk and data is recorded on tracks provided on the recording surface.

A magnetic head assembly including a magnetic head is supported on a rotatable carriage. The carriage is rotated by means of a voice coil motor so that the magnetic heads are moved relative to the magnetic disk.

Recently, in order to increase a memory capacity, a magnetic disk drive is provided with a plurality of, for example, two or three magnetic disks. The magnetic disks are rotated and magnetic head assemblies are moved in a swinging manner over recording surfaces provided on top and bottom surfaces of each magnetic disk. Thereby, data is recorded on the recording surfaces.

In this type of magnetic disk drive having a plurality of magnetic disks, a plurality of arms are provided on the carriage. A plurality of magnetic head assemblies are attached to the arms such that each magnetic disk is sandwiched by the magnetic head assemblies on both sides.

According to one assembling method, there are provided a carriage having a plurality of arms each having a through-hole, and a plurality of magnetic head assemblies having cylindrically projecting mount portions designed to be fitted in the through-holes. The mount portions are fitted in the through-holes from both ends of the through-holes and fixed by calking. Thus, each arm is provided with a pair of head assemblies.

According to another assembling method of the so-called "interlock" type, there are provided magnetic head assemblies having cylindrically projecting first mount portions designed to be fitted in through-holes of the arms, and magnetic head assemblies having cylindrically projecting second mount portions designed to be fitted in the first mount portions. The first mount portions are fitted in the through-holes from first ends of the through-holes, respectively, and the second mount portions are inserted in the through-holes from second ends of the through-holes, respectively. The inserted end portions of the second mount portions are fitted in the end portions of the first mount portions and are fixed by calking. According to this interlock-type method, the thickness of each arm can be reduced by a degree corresponding to overlapping between the first and second mount portions.

In the assembly, high precision is required. Specifically, small-sized magnetic head assemblies are conventionally attached to small-sized arms arranged with small intervals by manual work, and not by mechanical work.

In the former assembly method, the mount portions of the magnetic head assemblies are manually inserted in the through-holes of the arms from both sides of the through-holes so that all the magnetic head assemblies are situated in predetermined positions, i.e. each pair of magnetic head assemblies are situated to face each other inwardly between adjacent two of the arms.

At this time, since the mount portions of the magnetic head assemblies are simply inserted in the through-holes of the arms, the magnetic head assemblies are unstable and tend to be displaced.

Thereafter, a calking steel ball is passed through the inner holes of the mount portions under pressure, thereby fixing the mount portions to the arms by calking. The steel ball has a diameter slightly greater than the inside diameter of each mount portion. Thus, with the passing of the steel ball under pressure, each mount portion is deformed so as to bite into the inner surface of the associated through-hole and fixed to the associated arm. Thereby, the magnetic head assemblies are assembled and situated to sandwich the magnetic disks from both sides.

On the other hand, according to the latter assembly method, the first mount portions are manually inserted in the through-holes of the arms successively from the first ends of the through-holes, and the second mount portions are inserted in the through-holes from the second ends of the through-holes and fitted in the first mount portions. As a result, each pair of magnetic head assemblies are situated to face each other between adjacent two of the arms.

At this time, since the mount portions of the magnetic head assemblies are simply inserted in the through-holes of the arms, the magnetic head assemblies are unstable and tend to be displaced.

Thereafter, a calking steel ball is passed through the inner holes of the second mount portions under pressure, thereby fixing the first and second mount portions to the arms by calking.

In each of the above assembly methods, a great deal of time is needed to attach the magnetic head assemblies to the arms. Specifically, in the case where the magnetic head assemblies are set, while a first group of magnetic head assemblies are unstably set on the arms, a second other group of magnetic head assemblies need to be set on the arms.

This process must be carried out carefully since the second set of magnetic head assemblies must be set without moving the already set first group of magnetic head assemblies, by making use of narrow spaces between the arms.

In particular, in the interlock-type assembly method, a first group of magnetic head assemblies are unstably disposed on first surfaces of the arms, and the first and second mount portions are engaged in the through-holes. These steps tend to displace the already set magnetic head assemblies (by external force), and require careful handling.

The work with low efficiency is thus continued from the fixation of the first magnetic head assembly to the fixation of the last magnetic head assembly. The work load on the operator is considerably great, and a great deal of working time is needed. Consequently, the magnetic head assemblies cannot be attached to the carriage efficiently.

SUMMARY OF THE INVENTION

The present invention has been made in consideration of the above circumstances, and its object is to provide a method of assembling a carriage assembly, which makes it possible to easily attach magnetic head assemblies to a carriage, thereby reducing a work load on an operator.

In order to achieve the above object, according to a method of assembling a carriage assembly as recited in claim 1, all first magnetic head assemblies facing first surfaces of associated magnetic disks are fixed to first surfaces of arms by inserting and calking mount portions of the first magnetic head assemblies in through-holes of the associated arms. Then, all second magnetic head assemblies facing second surfaces of the magnetic disks are fixed to second surfaces of the arms by inserting and calking mount portions of the second magnetic head assemblies in the through-holes of the associated arms.

According to an assembly method of a carriage assembly as recited in claim 3, all first magnetic head assemblies facing first surfaces of associated magnetic disks are fixed to first surfaces of arms by inserting and calking first mount portions of the magnetic head assemblies in through-holes of the associated arms. Then, all second magnetic head assemblies facing second surfaces of the magnetic disks are fixed to second surfaces of the arms by inserting and calking second mount portions of the second magnetic head assemblies in the first mount portions of the first magnetic head assemblies.

According to the assembly method as recited in claim 1, all the first magnetic head assemblies facing the first surfaces of the magnetic disks are easily attached to the associated arms by making use of wide spaces provided by alternate arrangement of the head assemblies. These magnetic head assemblies are fixed to the arms by calking. Subsequently, all the second magnetic head assemblies facing the second surfaces of the magnetic disks are attached to the arms. In this case, the adjacent first magnetic head assemblies facing the first surfaces of the disks are already fixed and are not dislocated even if an external force is applied. Thus, careful work is not required, and the second magnetic head assemblies can easily be attached by making use of the spaces between the arms.

Therefore, the magnetic head assemblies can be attached to the arms of the carriage with a less work load, and the work time can be reduced.

Similarly, according to the assembly method as recited in claim 3, the first magnetic head assemblies are already fixed to the arms by calking when the second magnetic head assemblies are to be attached to the arms. Even if an external force is applied, the first magnetic head assemblies cannot be dislocated. Thus, careful work is not required, and the second magnetic head assemblies can easily be attached by making use of the spaces between the arms.

Therefore, with a less load of work and less work time, the magnetic head assemblies can be attached to the arms of the carriage by the interlock-type method.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 and 2 show a magnetic disk drive to which an assembly method of the present invention is applied, in which:

FIG. 1 is a perspective view showing the structure of the entire magnetic disk drive, and FIG. 2 is a partially broken side view showing a carriage assembly of the magnetic disk drive;

FIGS. 3 to 6 show an assembly method according to a first embodiment of the present invention, in which:

FIG. 3 is an exploded perspective view illustrating a step of attaching first magnetic head assemblies to arms of a carriage, FIG. 4 is a cross-sectional view illustrating a step of fixing the first magnetic head assemblies to the arms by calking, FIG. 5 is an exploded perspective view illustrating a step of attaching second magnetic head assemblies to the arms of the carriage to which the first magnetic head assemblies have been fixed, and FIG. 6 is a cross-sectional view illustrating a step of fixing the second magnetic head assemblies to the arms by calking; and FIGS. 7 to 10 show an assembly method according to a second embodiment of the present invention, in which FIG. 7 is an exploded perspective view illustrating a step of attaching first magnetic head assemblies to arms of a carriage, FIG. 8 is a cross-sectional view illustrating a step of fixing the first magnetic head assemblies to the arms by calking, FIG. 9 is an exploded perspective view illustrating a step of attaching second magnetic head assemblies to the arms of the carriage to which the first magnetic head assemblies have been fixed, and FIG. 10 is a cross-sectional view illustrating a step of fixing the second magnetic head assemblies to the arms by calking.

DETAILED DESCRIPTION OF THE PREFERRED EMBODIMENTS

Embodiment of the present invention will now be described with reference to the accompanying drawings.

A description will first be given of a magnetic disk drive to which the assembly method of the present invention is applied, for example, a hard disk drive (HDD).

Figure 1:
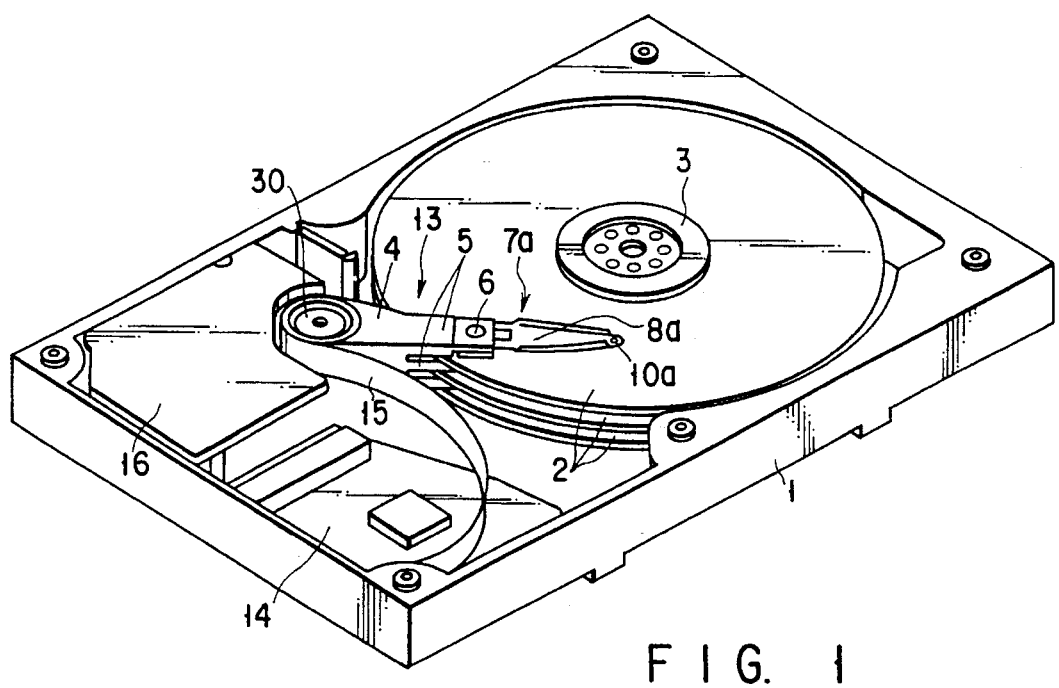

As is shown in FIG. 1, the HDD has a rectangular housing 1 with an open top surface. For example, three magnetic disks 2 are vertically arranged at predetermined intervals in a right-hand region in the housing 1. The central portions of the magnetic disks 2 are coupled to a hub 3 of a spindle motor (not shown) mounted in the housing 1. The magnetic disks 2 are rotated at high speed by the spindle motor.

Figure 3:
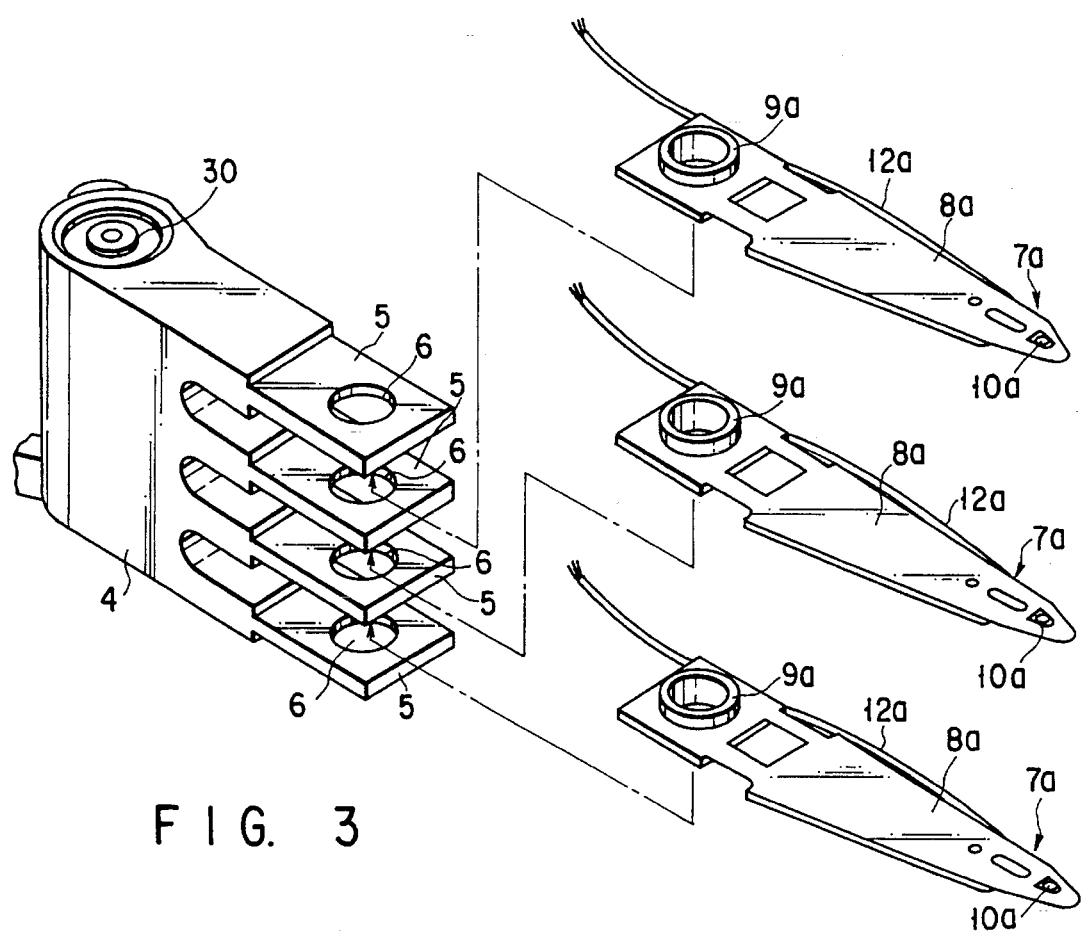
Figure 2:
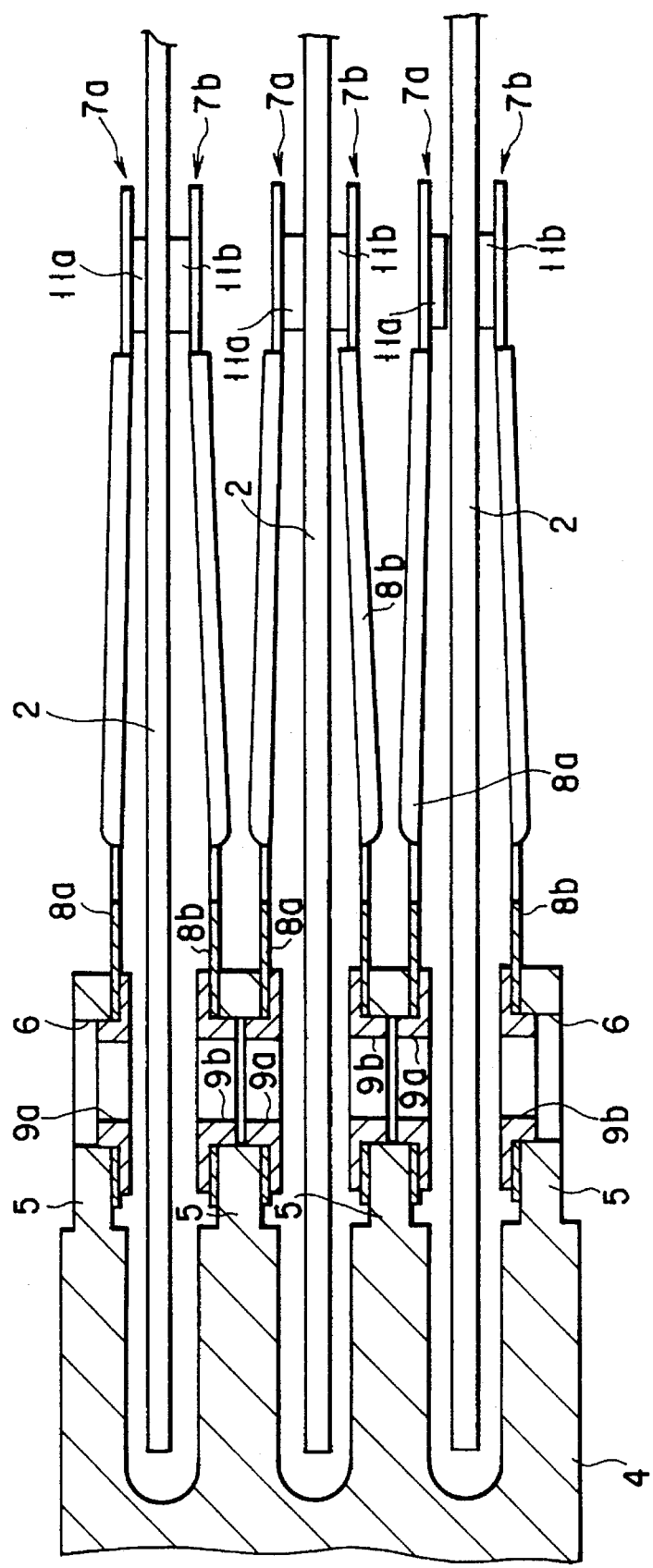

A carriage 4 rotatable on a support shaft 30 fixed on the housing 1 is contained in a left-hand region in the housing 1. As is shown in FIGS. 2 and 3, four plate-like arms 5 extending in a axis perpendicular to the axis of the support shaft 30 are provided on the carriage 4. These arms 5 are juxtaposed at predetermined intervals. Outer peripheral portions of the magnetic disks 2 are inserted between adjacent two of the arms 5, respectively. The arms 5 extend along recording surfaces formed on top and bottom surfaces of the disks 2. A through-hole 6 is formed in a distal end portion of each arm 5. The through-holes 6 of the arms 5 are coaxial with each other, and the center axes of the through-holes 6 are parallel to the support shaft 30.

Three first magnetic head assemblies 7a having magnetic heads 11a facing the upper recording surfaces of the associated magnetic disks 2 are fixed to the upper three arms 5 of the arms 5. Second magnetic head assemblies 7b having magnetic heads 11b facing the lower recording surfaces of the associated magnetic disks 2 are fixed to the lower three arms 5 of the arms 5.

As is shown in FIGS. 2 and 3, each first magnetic head assembly 7a includes an elongated belt-shaped suspension 8a, an upward mount portion 9a provided on a proximal end portion of the suspension 8a, and the magnetic head 11a supported downward on a distal end portion of the suspension 8a via a gimbal 10a. Reference numeral 12a denotes a lead wire extending along a right-hand edge portion of the suspension 8a from the magnetic head 11a.

Figure 5:
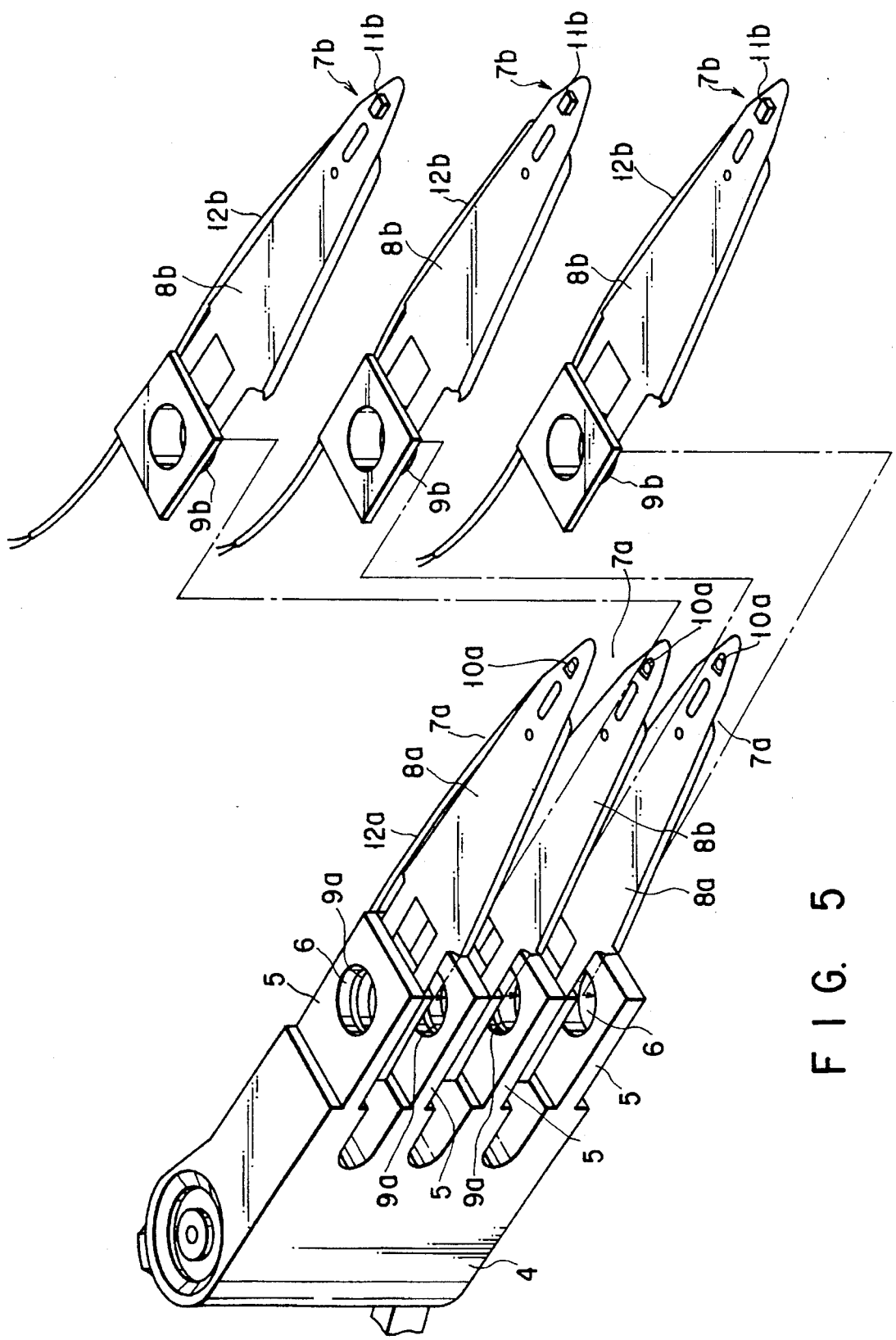

As is shown in FIGS. 2 and 5, the second magnetic head assembly 7b has substantially the same structure as the first magnetic head assembly 7a. A downward mount portion 9b is provided on a proximal end portion of a belt-shaped suspension 8b, and the magnetic head 11b is supported upward on a distal end portion of the suspension 8b via a gimbal 10b. Reference numeral 12b denotes a lead wire extending along a right-hand edge portion of the suspension 8b from the magnetic head 11b.

Each of the mount portions 9a and 9b has a cylindrical shape such that it can be fitted in the through-hole 6. Each of the first magnetic head assemblies 7a is coupled to the carriage 4 by inserting the mount portion 9a in the through-hole 6 of the associated arm 5 from the bottom and fixing the mount portion 9a by calking. Each of the second magnetic head assemblies 7b is coupled to the carriage 4 by inserting the mount portion 9b in the through-hole 6 of the associated arm 5 from the top and fixing the mount portion 9b by calking.

A carriage assembly 13 is constituted by the carriage 4 and three pairs of first and second magnetic head assemblies 7a and 7b sandwiching the magnetic disks 2.

As is shown in FIG. 1, a control circuit board 14, which is connected to the lead wires 12a and 12b of the magnetic heads 11a and 11b via a flat cable 15, is disposed in the left-hand region in the housing 1. In addition, a voice coil motor 16 for rotating the carriage 4 is contained in the housing 1. Each of the magnetic heads 11a and 11b is moved between an innermost peripheral portion and an outermost peripheral portion of the associated magnetic disk 2 by a thrust force generated by the voice coil motor 16. Thereby, data is recorded on the recording surfaces of each magnetic disk, or the recorded data is reproduced.

The method of the present invention is applied to the assembling of the carriage assembly 13 of the magnetic disk drive having the above construction. The assembly method according to the embodiment of the invention will now be described.

Specifically, when the first and second magnetic head assemblies 7a and 7b are to be attached to the carriage 4, the carriage 4 is first set on an alignment jig (not shown).

Then, either the first magnetic head assemblies 7a or second magnetic head assemblies 7b, e.g. first magnetic head assemblies 7a, are attached to the associated arms 5.

Figure 4:
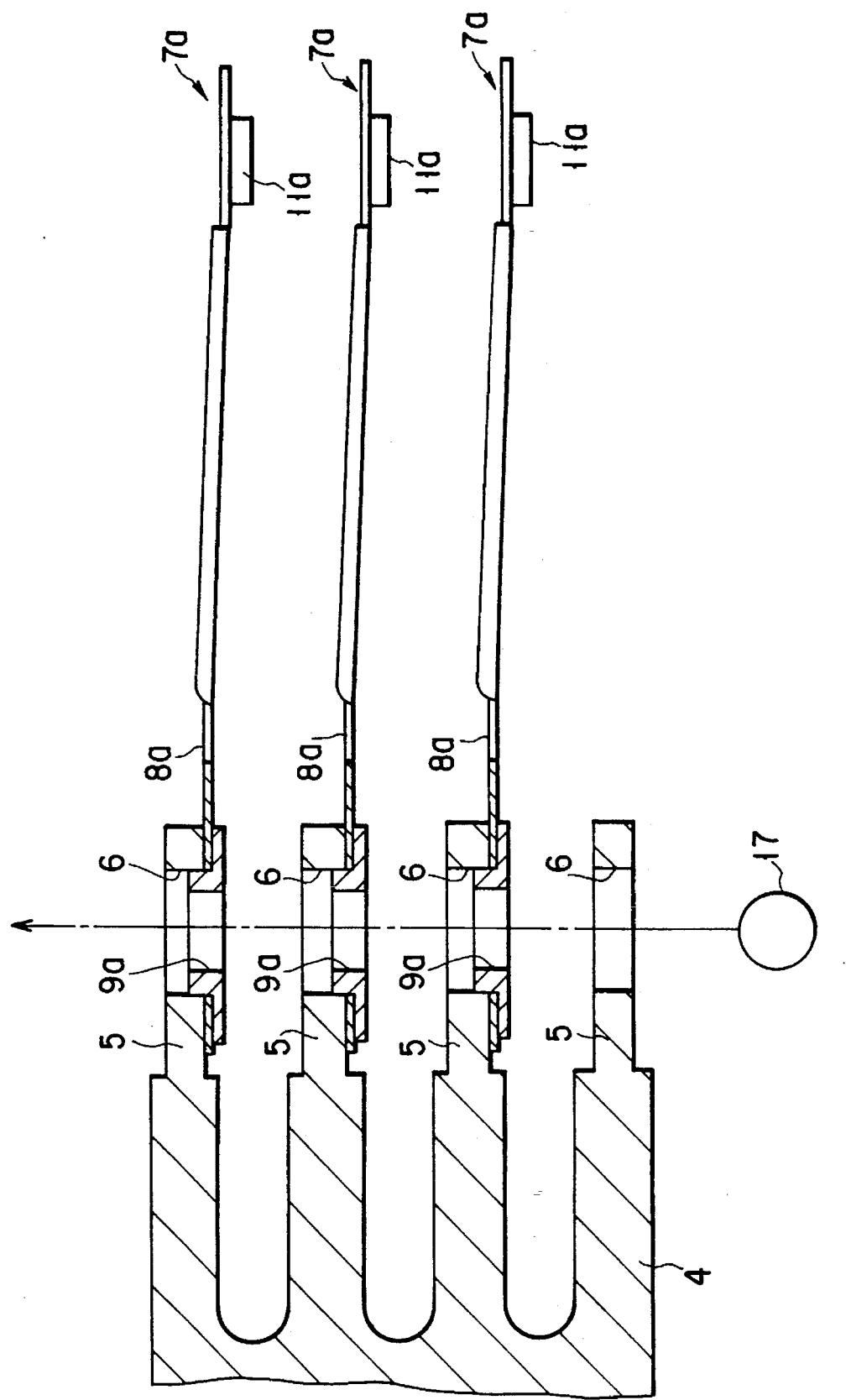

In this case, as shown in FIGS. 3 and 4, the magnetic head assemblies 7a are arranged successively on the bottom surface of the uppermost arm 5, the bottom surface of the immediately below (middle upper) arm 5, and the immediately below (middle lower) arm 5, and the mount portions 9a are fitted in the associated through-holes 6. Thereby, the three magnetic head assemblies 7a are situated in predetermined positions.

Through the above steps, the three first magnetic head assemblies 7a facing the top surfaces of the magnetic disks 2 are easily attached to the distal end portions of the arms 5 by making use of relatively wide spaces.

After the first magnetic head assemblies 7a have been attached, a calking steel ball 17 is passed under pressure through the inner holes of the mount portions 9a, as shown in FIG. 4. Thus, the slightly movable mount portions 9a are fixed to the arms 5 by calking. Specifically, since the steel ball 17 has a diameter slightly greater than the inside diameter of each mount portion 9a, the mount portion 9a is deformed so as to bite into the inner surface of the through-hole 6 with the passing of the steel ball 17 under pressure and the three magnetic head assemblies 7a are fixed to the arms in the same direction.

Figure 6:
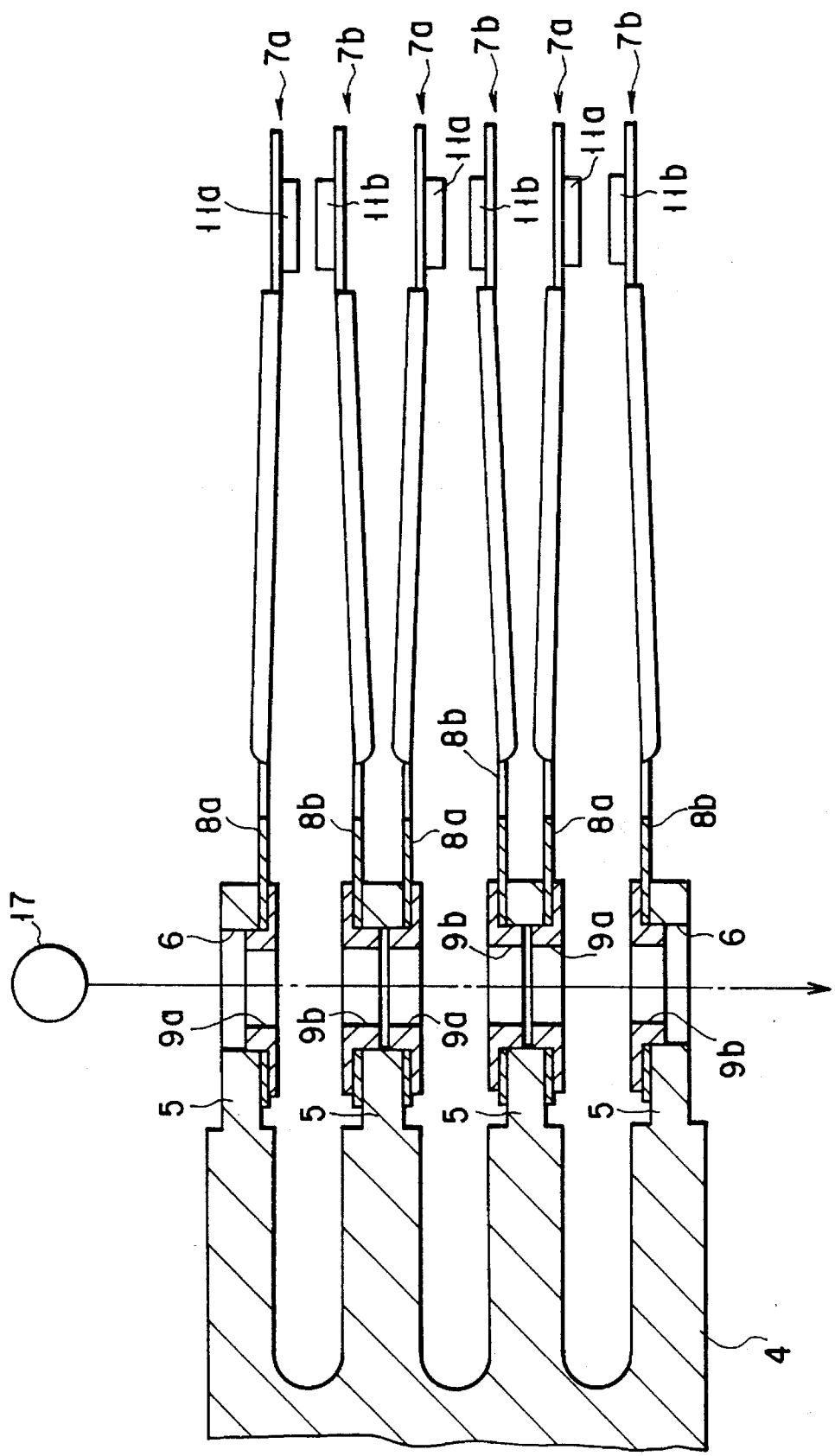

After the downwardly directed first head assemblies 7a have been fixed to the bottom surfaces of the upper three arms 5, the upwardly directed second head assemblies 7b are attached to the top surfaces of the arms 5. Specifically, as shown in FIGS. 5 and 6, the magnetic head assemblies 7b are arranged successively on the top surface of the middle upper arm 5, the top surface of the middle lower arm 5, and the top surface of the lowermost arm 5, and the mount portions 9b are fitted in the associated through-holes 6. Thereby, the three magnetic head assemblies 7b are situated in predetermined positions so as to face the already fixed first magnetic head assemblies 7a, respectively.

At this time, since the adjacent first magnetic head assemblies 7a have already fixed in the preceding step and are not dislocated even if an external force is applied. Thus, the second magnetic head assemblies 7b are easily attached to the arms 5 by making use of the space between the arms, with no need of careful handling.

After the second magnetic head assemblies 7b have been attached, the calking steel ball 17 is passed under pressure through the inner holes of the mount portions 9b, as shown in FIG. 6. Thus, the slightly movable mount portions 9b are fixed to the arms 5 by calking. Specifically, since the steel ball 17 has a diameter slightly greater than the inside diameter of each mount portion 9b, the mount portion 9b is deformed so as to bite into the inner surface of the through-hole 6 with the passing of the steel ball 17 under pressure and the three magnetic head assemblies 7b are fixed to the arms in the same direction, as with the case of the downwardly directed magnetic head assemblies 7a.

Accordingly, the downwardly directly magnetic head assemblies 7a and upwardly directly magnetic head assemblies 7b can be easily fixed to the carriage 4, unlike the prior art. Therefore, the assembly work efficiency can be enhanced and the work time can be decreased.

In the above embodiment, after the downwardly directly magnetic head assemblies 7a are attached to the carriage 4, the upwardly directly head assemblies 7b are attached to the carriage 4. Inversely, after the upwardly directly magnetic head assemblies 7b are attached to the carriage 4, the downwardly directly head assemblies 7a may be attached to the carriage 4, with the same advantage obtained.

The method of the present invention is applicable not only to the assembling with the magnetic head assemblies having the mount portions of the same diameter, but also to the so-called "interlock-type" assembling with a combination of magnetic head assemblies having large-diameter mount portions and small-diameter mount portions.

A second embodiment of the present invention, which relates to the interlock-type assembling, will now be described with reference to FIGS. 7 to 10.

The second embodiment differs from the above-described first embodiment with respect to the structure wherein the downwardly directed first magnetic head assemblies 7a are provided with cylindrical first mount portions 20a each having an outer diameter substantially equal to the diameter of each through-hole 6 and the upwardly directed second magnetic head assemblies 7b are provided with second mount portions 20b to be fitted in the first mount portions 20a within the through-holes 6, i.e. cylindrical second mount portions 20b each having an outer diameter substantially equal to the inner diameter of each first mount portion 20a.

The method of the second embodiment will now be described with reference to magnetic head assemblies 7a and 7b having the mount portions 20a and 20b.

Specifically, when the first and second magnetic head assemblies 7a and 7b are to be attached to the carriage 4, the carriage 4 is first set on an alignment jig (not shown).

Figure 8:
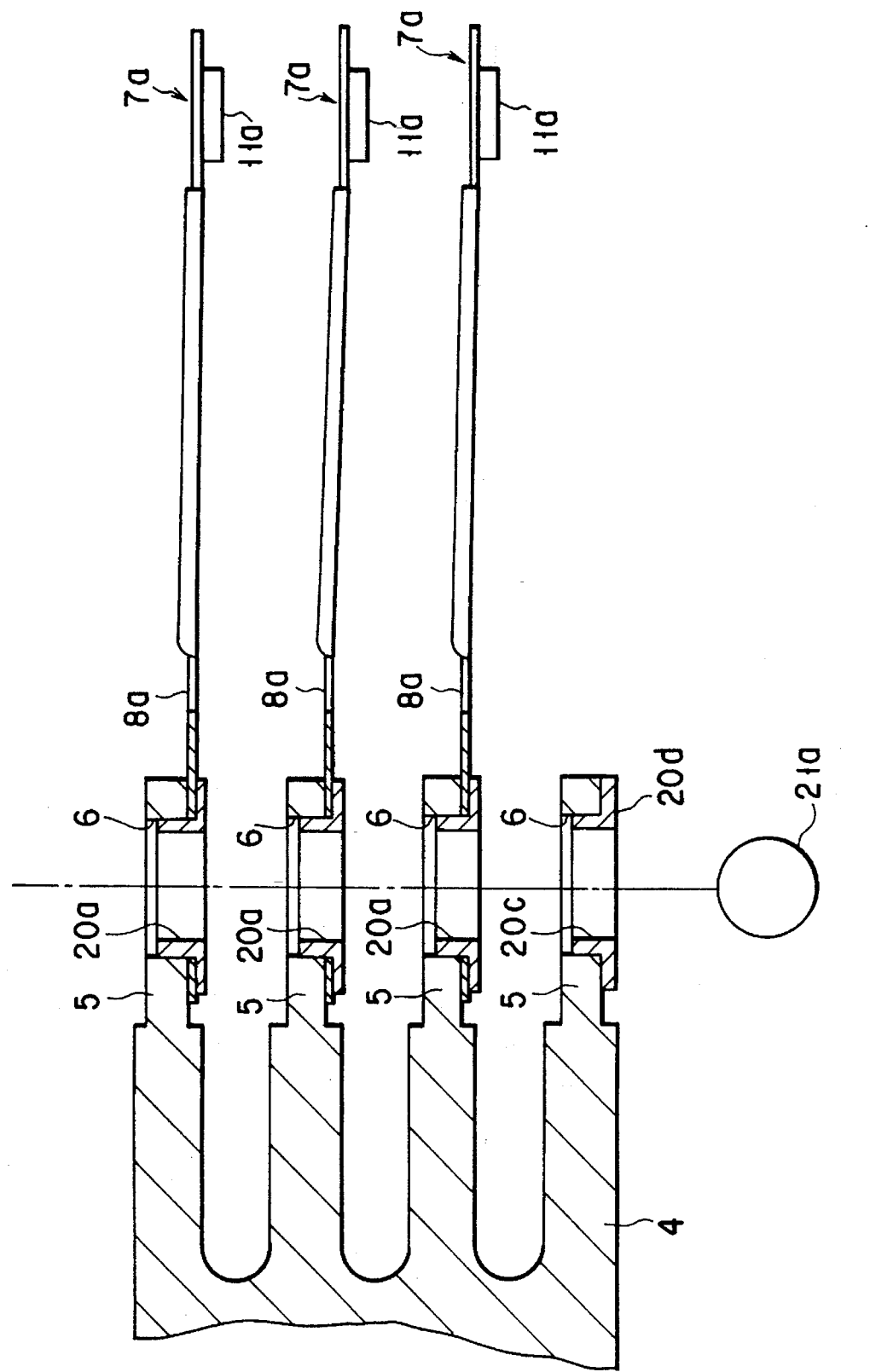

Then, the first magnetic head assemblies 7a are attached to the associated arms 5. As is shown in FIGS. 7 and 8, the magnetic head assemblies 7a are arranged successively on the bottom surface of the uppermost arm 5, the bottom surface of the immediately below (middle upper) arm 5, and the immediately below (middle lower) arm 5, and the mount portions 20a are fitted in the associated through-holes 6. Thereby, the three magnetic head assemblies 7a are situated in predetermined positions. A cap 20d having a mount portion 20c, which is substituted for the first mount portion 20a, is arranged on the bottom surface of the lowermost arm 5 and fitted in the through-hole.

Thereby, the three first magnetic head assemblies 7a facing the top surfaces of the magnetic disks 2 are easily attached to the distal end portions of the arms 5 by making use of wide spaces provided by alternate arrangement of the head assemblies.

After the first magnetic head assemblies 7a have been attached, a calking steel ball 21a having a diameter slightly greater than the inner diameter of each first mount portion 20a and the mount portion 20c is passed through the inner holes of the mount portions 20a and 20c under pressure. Thus, with the passing of the steel ball 21a under pressure, each mount portion is deformed so as to bite into the inner surface of the associated through-hole and fixed by calking. Thereby, the three first magnetic head assemblies 7a and the cap 20d are fixed to the arms in the same direction.

After the first magnetic head assemblies 7a have been fixed to the bottom side of the arms 5, the second magnetic head assemblies 7b are attached to the opposite side of the arms 5.

Figure 9:
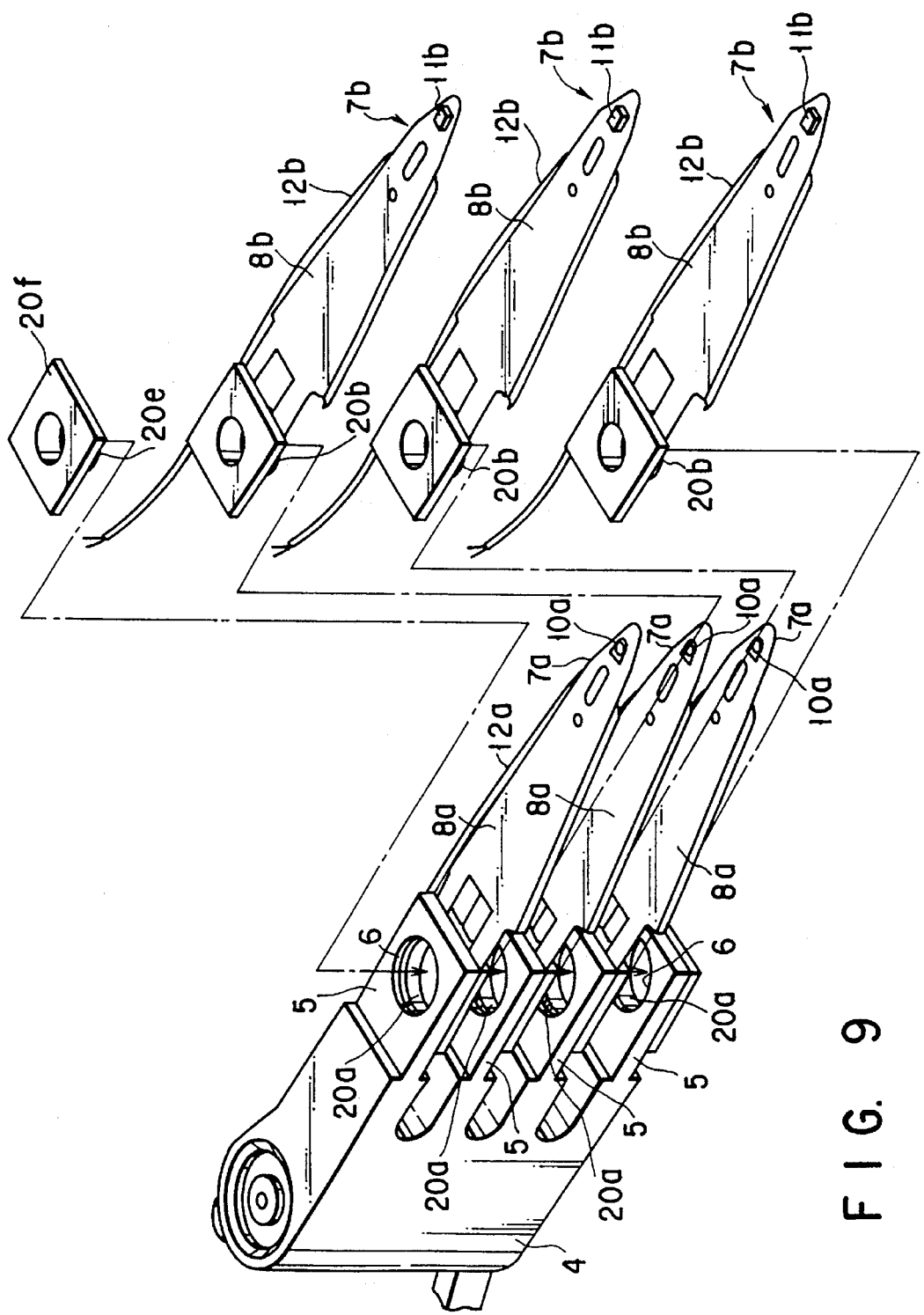
Figure 10:
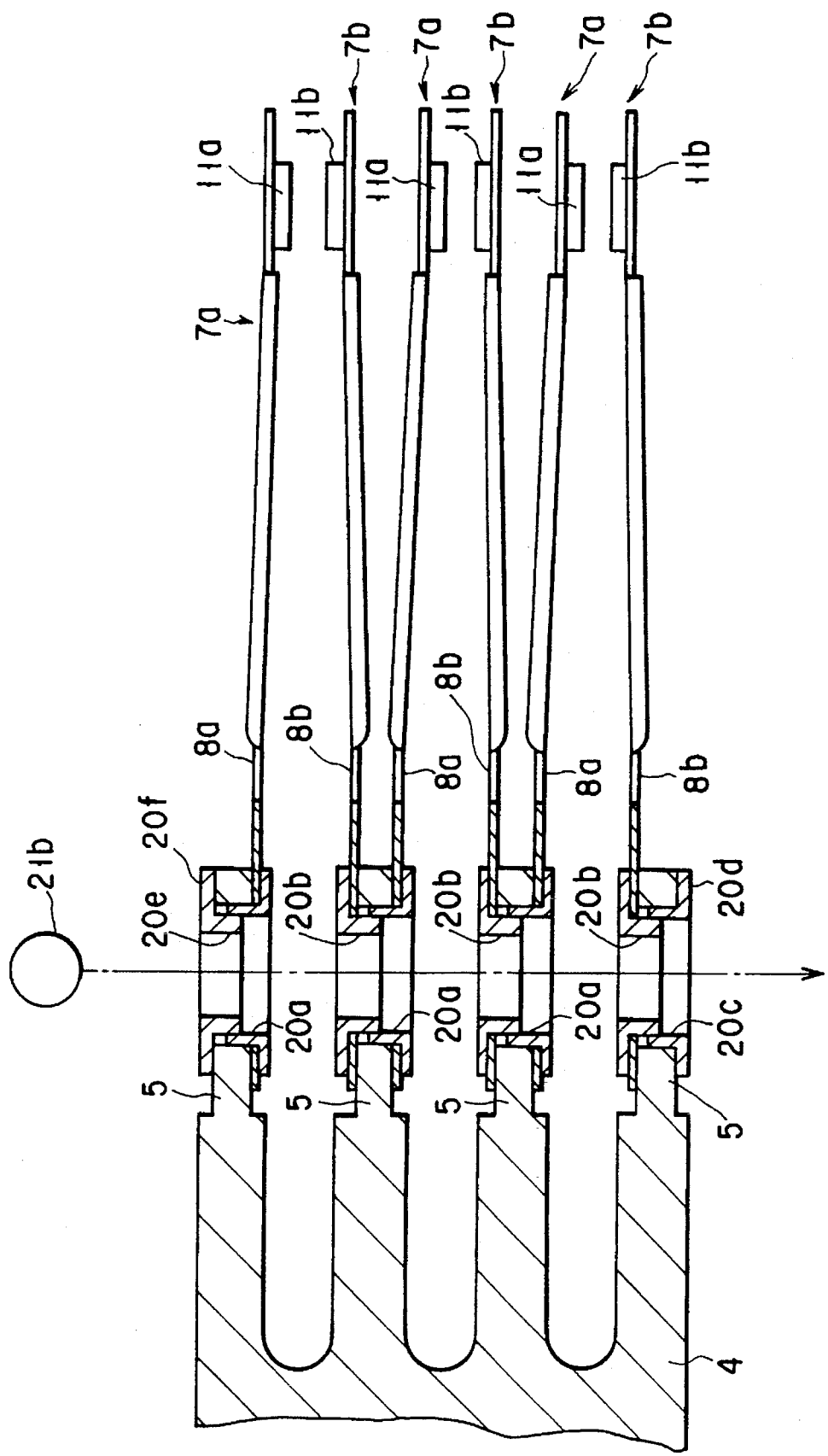

As is shown in FIGS. 9 and 10, a cap 20f having a mount portion 20e, which is substituted for the second mount portion 20b, is engaged in the top surface of the uppermost arm 5. The second magnetic head assemblies 7b are arranged successively on the top surface of the middle upper arm 5, the top surface of the middle lower arm 5, and the top surface of the lowermost arm 5, and the second mount portions 20b are fitted in the associated through-holes 6. The inserted end portions of the second mount portions 20b and 20e are inserted in the first mount portions 20a and the mount portion 20C of the cap 20f of the already fixed magnetic head assemblies 7a. Thereby, the magnetic head assemblies 7b are situated in predetermined positions.

In this case, the first mount portions 20a of the first magnetic head assemblies 7a mated with the second mount portions 20b have already been fixed in the preceding step, and therefore are not dislocated even if an external force is applied. Thus, the second magnetic head assemblies 7b are easily attached to the arms 5 by making use of the space between the arms, with no need of careful handling.

After the second magnetic head assemblies 7b have been attached, a calking steel ball 21b having a diameter slightly greater than the inner diameter of each of the second mount portion 20b and 20e is passed through the inner holes of the mount portions 20b and 20e under pressure, as shown in FIG. 10. Thus, with the passing of the steel ball under pressure, each mount portion 20b, 20e is deformed so as to bite into the inner surface of the associated mount portion 20a, 20c and fixed to the mount portion 20a, 20c by calking. Thereby, the three magnetic head assemblies 7b are fixed to the arms in the same direction.

As has been described above, even in the case of the interlock-type assembly method, the downwardly directed magnetic head assemblies 7a and upwardly directed magnetic head assemblies 7b can be fixed through easy steps.

As with the above-described first embodiment, in the second embodiment, all the magnetic head assemblies 7a and 7b can be fixed to the arms of the carriage 4 with a lesser work load. Therefore, the assembly work efficiency can be enhanced and the work time can be decreased.

In the above embodiments, six magnetic head assemblies are attached to the carriage. However, the number of magnetic head assemblies is not limited to six. For example, four, eight, or a greater even-number of magnetic head assemblies may be fixed to the carriage by the method of the present invention.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of assembling a carriage assembly of a magnetic disk drive, the carriage assembly including a carriage with a plurality of arms arranged in parallel at predetermined intervals and having end portions in which through-holes are formed, a plurality of first magnetic head assemblies with cylindrical first mount portions each having an outer diameter substantially equal to the diameter of each of the through-holes, and a plurality of second magnetic head assemblies with cylindrical second mount portions each having an outer diameter substantially equal to the inner diameter of each of the first mount portions, each of the first magnetic head assemblies being fixed to one side surface of an associated one of the arms with the first mount portion being engaged in the through-hole of the associated arm, each of the first magnetic head assemblies facing one surface of an associated one of magnetic disks situated between adjacent ones of the arms, each of the second magnetic head assemblies being fixed to the other side surface of an associated one of the arms with the second mount portion being engaged in the first mount portion engaged in the through-hole of the associated arm, each of the second magnetic head assemblies facing the other surface of the associated one of the magnetic disks, each magnetic disk being interposed between a pair of the mutually facing first and second magnetic head assemblies, said method comprising the steps of:

fixing each of the first magnetic head assemblies to one side surface of an associated one of the arms, by fitting and calking the first mount portion of the first magnetic head assembly in the through-hole of the associated arm; and fixing each of the second magnetic head assemblies to the other side surface of the associated one of the arms, after the first magnetic head assemblies are fixed, by fitting and calking the second mount portion of the second magnetic head assembly in an inner hole of the first mount portion fixed in the through-hole of the associated arm.

2. A method according to claim 1, wherein said step of calking the first mount portion includes passing a steel ball under pressure through the inner hole of the first mount portion fitted in the throughhole, the steel ball having a diameter greater than the inner diameter of the inner hole of the first mount portion.

3. A method according to claim 1, wherein the step of calking the second mount portion includes a step of passing a steel ball under pressure through an inner hole of the second mount portion engaged in the inner hole of the first mount portion, the steel ball having a diameter greater than the diameter of the inner hole of the second mount portion.

* * * * *

UNITED STATES PATENT AND TRADEMARK OFFICE
CERTIFICATE OF CORRECTION

PATENT NO. : 5,546,649
DATED : August 20, 1996
INVENTOR(S) : Machio SHIMANUKI

It is certified that error appears in the above-indentified patent and that said Letters Patent is hereby corrected as shown below:

Claim 2, column 9, line 9, "throughhole" should read --through-hole--.

Signed and Sealed this

Fourth Day of February, 1997

Attest:

BRUCE LEHMAN

Attesting Officer     Commissioner of Patents and Trademarks